Dec. 31, 1935.   S. J. KRANNAK   2,026,046
GREASE GUN
Filed April 4, 1932
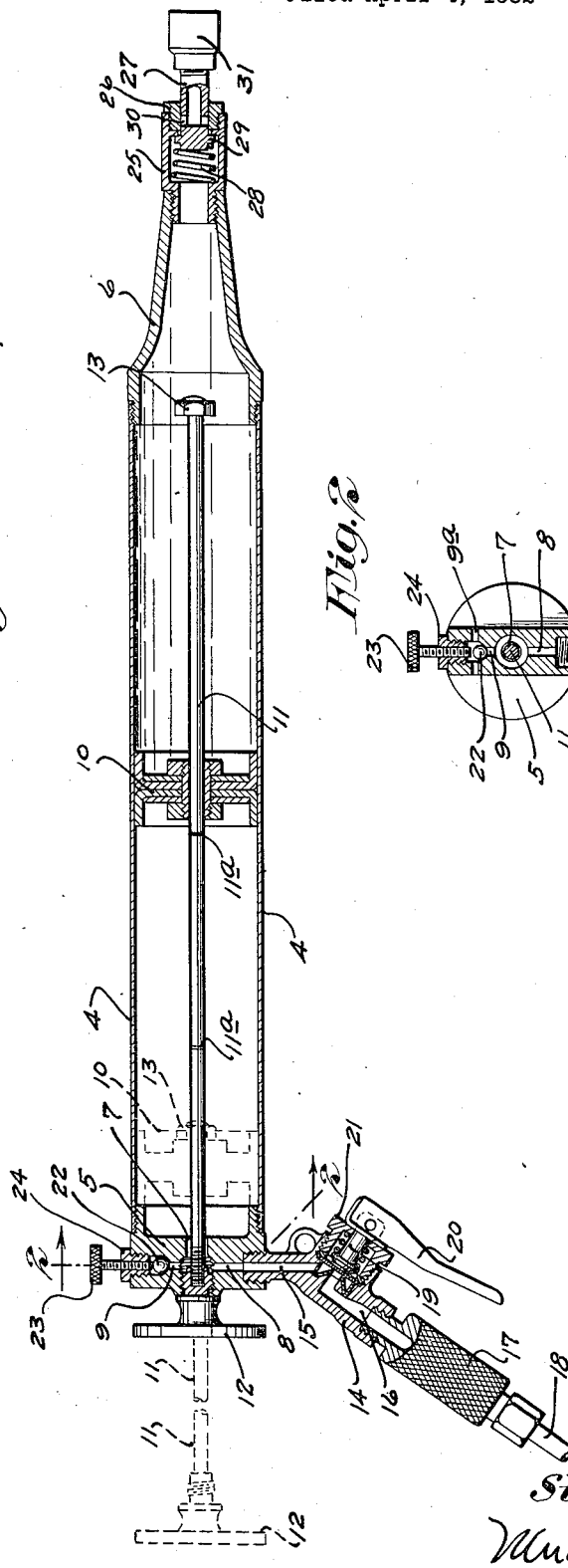
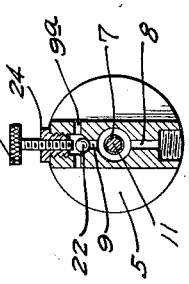
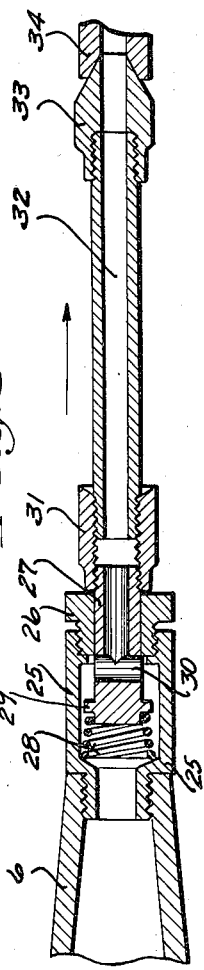
Inventor
Steven J. Krannak
By his Attorneys Patented Dec. 31, 1935

2,026,046

UNITED STATES PATENT OFFICE 2,026,046

GREASE GUN

Steven J. Krannak, Minneapolis, Minn., assignor to Min-A-Max Co., Minneapolis, Minn., a corporation of Minnesota Application April 4, 1932, Serial No. 603,025

1 Claim. (Cl. 221—47.4)

My present invention provides an extremely simple and highly efficient grease gun adapted to be operated pneumatically or by fluid pressure for the rapid discharge of grease in fairly large quantities and adapted to be quickly refilled or loaded by a simple hand operation. A grease gun of this kind will be found especially serviceable for the filling with grease of universal joints, differential, knuckle joints and the like which use medium heavy grease, but, of course, is suitable for general use.

In the accompanying drawing, which illustrates a commercial form of the invention, like characters indicate like parts throughout the several views.

Referring to the drawing:

Fig. 1 is an axial section showing the improved grease gun, some parts thereof being shown in full elevation;

Fig. 2 is a transverse section taken on the line 2—2 of Fig. 1; and

Fig. 3 is an axial section showing a modified form of the nozzle or discharge end of the grease gun.

Referring to the form illustrated in Figs. 1 and 2, the numeral 4 indicates a cylindrical long cylinder in the form of a metal tube internally threaded at its ends. Into the rear end of the cylinder 4, a cylinder block 5 is screwed with a fluid-tight joint and into the discharge or front end of said cylinder is screwed with a fluid-tight joint and contracted nozzle base 6. The cylinder head 5 is formed with an axial port 7 that connects with a downwardly extended port 8 and an upwardly extended port 9.

Working in the cylinder 4 is a self-sealing piston head 10, through the axis of which is extended a piston retracting rod 11. This rod 11, at its rear end, is screwed into or otherwise rigidly secured to a rod retracting head 12, the stem of which is screw-threaded into the cylinder head 5 but does not, even when applied, cut off communication between the ports 7, 8 and 9. At its inner end the rod 11 is provided with a head or an enlargement 13, shown as afforded by a nut riveted thereto.

An elbow-like valve casing 14 is screwed into the cylinder head 5 and has an air conduit 15 that communicates with the port 8. Said casing 14 also has an air conduit 16 that is connected by a coupling 17 to an air pipe 18 that leads from a suitable source of air under pressure, preferably through a flexible hose. Seated in the casing 14 is a spring-pressed valve 19 that normally cuts off communication between the air conduits 15 and 16 but which is arranged to be opened to connect said conduits by means of a lever 20. As shown, the valve 19 is directly mounted in a sort of cap nut 21 that is screwed into the valve casing 14 and against which lever 20 operates as a base of reaction, when pressed toward the coupling 17, to open said valve. Said lever 20 is, as it will be noted, located in such a position that it may be engaged by the fingers of the hand gripping the knurled exterior of the coupling 17. However, any other suitable valve may be employed.

Port 9 is normally closed by a valve, shown as in the form of a ball 22, that is held seated by a screw 23 that works with screw-threaded engagement through a plug 24 screwed into the head 5.

By reference to Fig. 2 it will be noted that outward of the ball valve 22, the rib on the back of the cylinder head 5 is formed with air relief ports 9ª, which, when ball valve 22 is released, permits escape of air from the rear end of the cylinder 4. Also, it will be noted that air passage 7 is of considerable greater diameter than the rod 11 so that said passage 7 is always open to ports 8 and 9. It will also be noted by reference to Fig. 1, that rod 11 is marked at 11ª to indicate the extent to which said rod is drawn out and hence the extent to which the piston 10 will be retracted.

Into the contracted end of the nozzle base 6 is a tubular extension 25 in the outer end of which is screwed an annular plug 26. A small tubular discharge nozzle 27 works axially through the plug 26, being normally pressed outward by a spring 28 seated in the extension 25. At its inner end the nozzle 27 is enlarged to form a flange 29 that is normally pressed against the plug 26 and limits the outward movement of the nozzle. The nozzle 27 has radial ports 30 normally closed by the plug 26 and arranged to be opened, when nozzle 27 is forced inward far enough to carry said ports 30 into the extension 25, past the inner end of plug 26.

The nozzle 27 is preferably formed with a cup-shaped nozzle tip 31 that adapts it to be pressed onto the receiving nipple of smaller diameter. This nozzle tip is also preferably internally threaded so that a nozzle extension tube 32, shown in Fig. 3, may be screwed into the same. This extension tube 32 is provided at its extended end with an externally tapered tubular nozzle tip 33 that adapts it to be pressed into a flaring end of a nipple 34. 34 illustrates what, in some instances, will be a grease receiving nipple but which, in some instances, will be a source of supply of grease under pressure, but which latter noted arrangement constitutes a feature of a companion application entitled "Muzzle loading grease gun".

The grease gun, above described, may be loaded in several different ways but, of course, it may be readily loaded and reloaded with grease when the nozzle base 6 is unscrewed from the cylinder 4. Also it may be loaded from the muzzle or discharge end when the gun is pressed, as shown in Fig. 3, into engagement with the nipple 34 which is a source of supply of grease under pressure. This latter noted feature, being as above stated, an important feature of the companion application just referred to.

When the gun is to be loaded or reloaded the head 12 will first be unscrewed from the cylinder head 5 so that piston 10 may be drawn back to any desired extent thereby drawing grease into the barrel or cylinder and filling the same to the extent depending upon the extent to which the piston is retracted.

The graduation marked 11a on rod 11 will indicate to the operator the amount of grease that is being drawn into the gun and such amount, of course, can be varied from minimum to the full holding capacity of the cylinder. The amount of grease drawn into the gun when it is desired to discharge a measured quantity thereof will depend on the amount of grease required to lubricate the particular device. Such for example as a universal joint, a knuckle joint or a differential. Before the discharge of grease can take place, the head 12 must, of course, be screwed back into the cylinder head 5. This being done and the nozzle 27 being forced into a grease-receiving cavity and pressed back so as to open ports 26 and air being then admitted by opening of valve 19, the piston 10 will be forced outward under a maximum pressure, depending on the pressure of air. The discharge of grease from the gun may thus be very easily and quickly accomplished. If the quantity of grease be measured and the full load discharged, refilling will be required between each operation but, of course, small successive discharges of grease may be accomplished by holding valve 19 open for a very short interval of time.

In actual practice this improved grease gun has been found highly efficient for the purpose had in view. It will handle not only medium heavy greases but oils and heavy greases. Of course, the heavier the grease the higher will be the air pressure to operate the gun or the slower discharge action of the gun.

What I claim is:

A grease gun comprising a cylinder, a piston working in said cylinder, means for applying pressure to said piston including an air delivery conduit connected to one end of said cylinder and provided with a controlling valve for regulating the air pressure on said piston, combined with, a normally closed relief valve independent of said control valve, for relieving the air pressure in said cylinder to permit retraction of the piston, said cylinder at its other end having a grease-delivery passage and an inwardly opening normally closed check valve in said grease passage arranged to be opened by axial pressure toward the interior of said cylinder, whereby when said check valve is pressed to open position while air pressure is applied to said piston, there will be a discharge of grease from said barrel and when said grease passage is connected to a source of grease supply under pressure, while the other end of said cylinder is relieved from pressure, grease will be delivered into said barrel and said piston will be retracted, in further combination with a retaining rod applied through the head of said cylinder and on which said piston is arranged to slide, said rod at its inner end having a piston retracting head, and said rod at its outer end having means for detaching the same to retract said piston.

STEVEN J. KRANNAK.